United States Patent

Yamamoto et al.

[11] Patent Number: 5,841,366
[45] Date of Patent: Nov. 24, 1998

[54] TRAVELING-PATH DEDUCTION APPARATUS AND METHOD FOR VEHICLES

[75] Inventors: Yasunori Yamamoto, Hiroshima; Ayumu Doi, Hatsukaichi; Tomohiko Adachi, Higashihiroshima; Tohru Yoshioka, Hiroshima, all of Japan

[73] Assignee: Mazda Motor Coporaton, Hiroshima-ken, Japan

[21] Appl. No.: 683,143

[22] Filed: Jul. 18, 1996

[30] Foreign Application Priority Data

Jul. 20, 1995 [JP] Japan ................................. 7-207609

[51] Int. Cl.$^6$ .................................................... G08B 1/00
[52] U.S. Cl. ............................ 340/901; 340/903; 340/435; 180/168; 180/169; 701/26; 701/208; 701/209; 701/205; 701/10
[58] Field of Search ............................ 340/901, 903, 340/435, 436; 364/424.01, 424.02, 426.04, 461, 443, 447, 449.4, 449.3; 182/169, 167, 168; 348/149; 701/23, 25, 26 R, 28, 200, 201, 202, 208, 209, 205, 210, 211

[56] References Cited

U.S. PATENT DOCUMENTS 5,377,106  12/1994  Drunk et al. ...................... 364/424.02

FOREIGN PATENT DOCUMENTS 4-282724  10/1992  Japan .

*Primary Examiner*—Jeffery A. Hofsass
*Assistant Examiner*—Julie B. Lieu

[57] ABSTRACT

A traveling-path temporary-setting unit 21 sets a plurality of temporary traveling paths with different curvatures, and a calculation unit 22 calculates distances between the temporary traveling paths and preceding vehicles detected by a radar unit 1. In case of a properly-set temporary traveling path, the path and running loci of the preceding vehicles are on a concentric circle. In this case, the preceding vehicles are running along this temporary traveling path, and a time change amount of calculated distances is approximately "0". A traveling-path determination unit 23 determines, one temporary traveling path having the minimum time change amount in the distances, as a traveling path of the vehicle.

34 Claims, 9 Drawing Sheets

F I G. 1
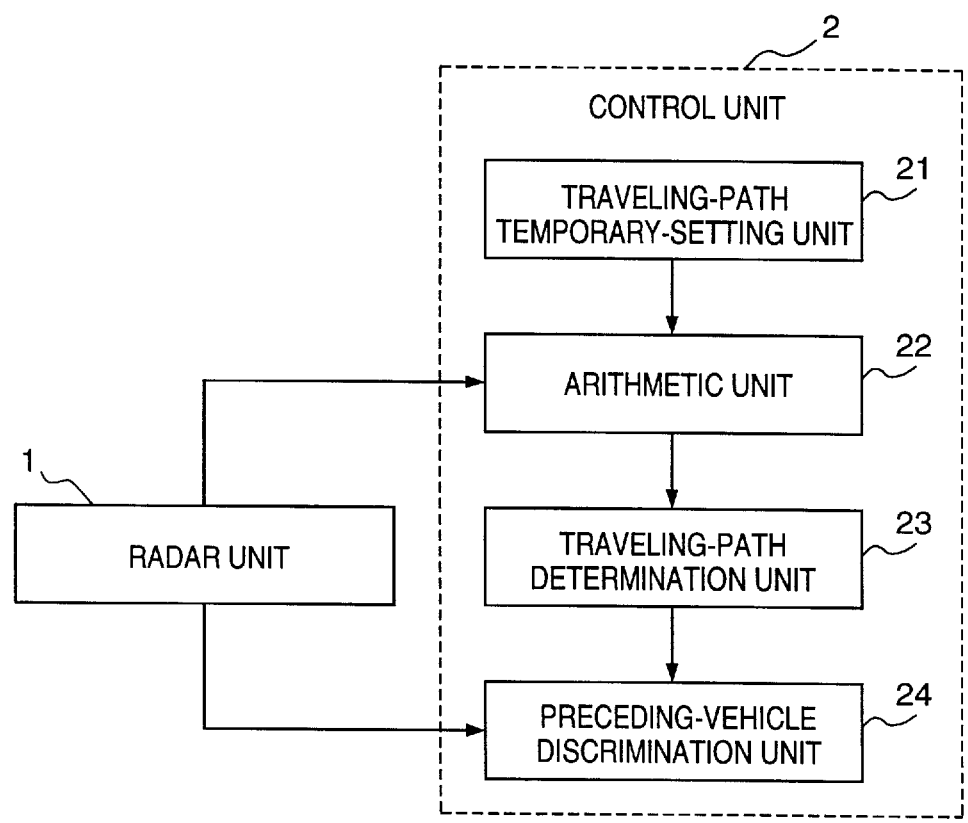

TRAVELING-PATH DEDUCTION APPARATUS AND METHOD FOR VEHICLES

BACKGROUND OF THE INVENTION

1. Field of the Invention

This invention relates to a traveling-path deduction apparatus which detects relative-position data between a vehicle and a preceding vehicle, and deduces a traveling path of the vehicle based on a time change amount in the detected relative-position data.

2. Description of Related Art

Recently, several techniques on the premise of running on a highway have been developed; for example, a technique of driving a vehicle to follow the preceding vehicle, and a technique of detecting that the distance between a vehicle and the preceding vehicle has become shorter and warning the driver so as to avoid collision between the preceding vehicle are known.

In these techniques, it is necessary to discriminate one preceding vehicle among a plurality of vehicles running ahead of the vehicle. Generally, the discrimination of preceding vehicle is made by using a radar unit that emits a radar wave forward of the vehicle so as to detect objects existing in front of the vehicle. Based on the detection results and the traveling path, which is deduced as a path on which the vehicle is going to travel, one object at the shortest distance from the vehicle is discriminated as the preceding vehicle, from the plurality of preceding vehicles.

The conventional traveling-path deduction is made by calculating the turning radius (curvature) based on the steering angle, a yaw rate and the like of the vehicle, as disclosed in Japanese Patent Application Laid-Open No. 4-282724.

As another example of traveling-path deduction, Japanese Patent Application Laid-Open No. 6-249653 discloses a technique of sensing the preceding vehicles by an image sensor. Within a window provided in the vehicle, a driver of the vehicle designates one image as a preceding vehicle to be followed. While following the preceding vehicle within the window, the distance between the vehicle and the preceding vehicle is measured. The road shape (curvature) of the traveling path in front of the vehicle is deduced from the position of the preceding vehicle on the window and the distance between the vehicles, and if the deduced road shape does not correspond with a road shape deduced from a steering-angle change amount, following the preceding vehicle in the window is terminated.

However, in the above conventional techniques, for deducing the traveling-path from the steering angle, yaw rate etc. of the vehicle, a steering-angle sensor, a yaw-rate sensor and the like are required, which increases costs.

SUMMARY OF THE INVENTION

The present invention has been made in consideration of the above situation, and has its object to provide a traveling-path deduction apparatus and method which detects objects existing ahead of a vehicle and deduces a traveling path of the vehicle from the detection result, without particular sensors, thus reducing costs.

According to the present invention, the foregoing object is attained by providing a traveling-path deduction apparatus which detects objects existing ahead of a vehicle and deduces a traveling path of the vehicle, comprising: object detection means for detecting the objects existing ahead of the vehicle; traveling-path temporary-setting means for setting a temporary traveling path as a line having a predetermined curvature, extending from the vehicle as an original point, based on results of detection by the object detection means; distance calculation means for calculating distances between the temporary traveling path set by the traveling-path temporary-setting means and the objects detected by the object detection means; and traveling-path deduction means for deducing the traveling path of the vehicle, based on a time change amount in the distances calculated by the distance calculation means.

Further, according to another aspect of the present invention, the foregoing object is attained by providing a traveling-path deduction method for detecting objects existing ahead of a vehicle and deducing a traveling path of the vehicle, comprising: an object detection step of detecting the objects existing ahead of the vehicle; a traveling-path temporary-setting step of setting a temporary traveling path as a line having a predetermined curvature, extending from the vehicle as an original point, based on results of detection at the object detection step; a distance calculation step of calculating distances between the temporary traveling path set at the traveling-path temporary-setting step and the objects detected at the object detection step; and a traveling-path deduction step of deducing the traveling path of the vehicle, based on a time change amount in the distances calculated at the distance calculation step.

Further, according to another aspect of the present invention, the foregoing object is attained by providing a traveling-path deduction apparatus for detecting objects existing ahead of a vehicle and deducing a traveling path of the vehicle, comprising: object detection means for detecting the objects existing ahead of the vehicle; data calculation means for calculating data indicating positional relation between the vehicle and the objects, based on results of detection by the object detection means; traveling-path deduction means for deducing the traveling path of the vehicle, based on the data indicating the positional relation.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a block diagram showing the construction of a control system of a traveling-path deduction apparatus according to a first embodiment of the present invention;

DETAILED DESCRIPTION OF THE PREFERRED EMBODIMENTS

Figure 2:
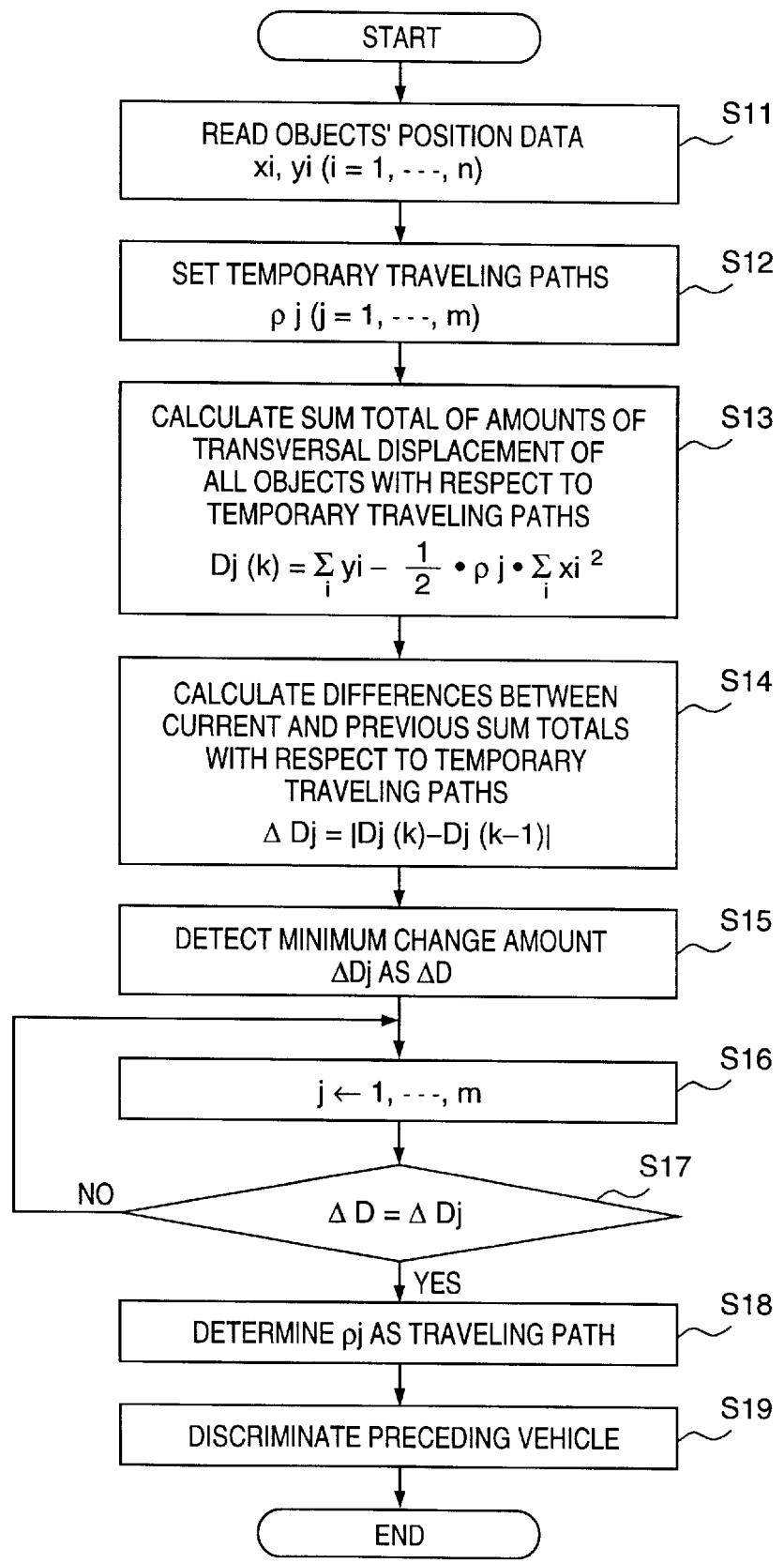
FIG. 2 is a flowchart showing a traveling-path deduction procedure according to the first embodiment.

Preferred embodiments of the present invention will now be described in detail in accordance with the accompanying drawings.

General Embodiment

First, a traveling-path deduction apparatus and a traveling-path deduction method common to a first to third embodiments to be explained later will be described.

Description of Apparatus

As shown in FIG. 1, a vehicle to which the embodiments are applied has a radar unit 1, and a control unit 2 which receives a detection signal from the radar unit 1 and deducts a traveling path of the vehicle.

The radar unit 1 is usually mounted on a front part of the vehicle body. It emits pulse laser light as a radar wave forward of the vehicle. The radar unit 1 receives a reflection wave reflected from objects such as preceding vehicles existing in front of the vehicle or reflectors with a receiver, and outputs detection data on the positions to the control unit 2. The radar unit 1 is a scanning-type radar unit that sways pulse laser light (scan beam) which extends forward from the vehicle, with a small divergence angle in the direction approximately vertical to the road surface, rightward and leftward within a comparatively wide angle. The radar unit 1 emits and scans the radar wave forward of the vehicle within a predetermined angle to detect objects such as preceding vehicle(s) and reflectors existing in front of the vehicle.

The control unit 2 has a traveling-path temporary-setting unit 21 which sets a temporary traveling path of the vehicle at a predetermined curvature, an arithmetic unit 22 which calculates distances between objects and the temporary traveling path (amounts of transversal displacement), based on the temporary traveling path set by the traveling-path temporary-setting unit 21 and detection data from the radar unit 1, a traveling-path determination unit 23 which determines one of temporary traveling paths set by the traveling-path temporary-setting unit 21, as the traveling-path of the vehicle, based on the results of calculation by the arithmetic unit 22, and a preceding-vehicle discrimination unit 24 which discriminates a preceding vehicle (object) running on the deduced traveling path, at the shortest distance from the vehicle, which is closest to the vehicle, as an object preceding vehicle, based on the traveling path determined by the traveling-path determination unit 23 and the detection data from the radar unit 1. The control unit 2 having the above construction can deduce a traveling path of the vehicle and discriminate a preceding vehicle with only the detection data inputted from the radar unit 1.

Principles of Deduction Method

Figure 7:
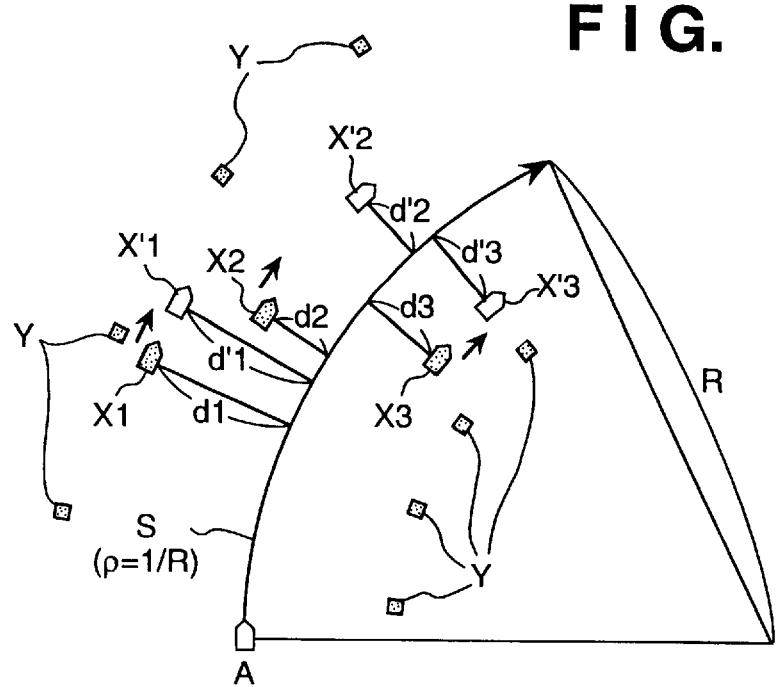
FIGS. 7 to 10 are explanatory views showing the principles of the traveling-path deduction method according to the present invention.

FIG. 7 shows a case where a vehicle A is running on a road having a curvature ρ (reciprocal number of turning radius R). All the other vehicles X1 to X3 or reflectors Y are positioned on a concentric circle, and the vehicles X1 to X3 are running along a temporary traveling path S having the curvature ρ on which the vehicle A is going to run (in FIG. 7, the vehicles X1 to X3 moved from solid-black positions X1 to X3 to blank positions X'1 to X'3 after a predetermined period). Comparing distances d1 to d3 between the traveling path S and the vehicles X1 to X3, with distances d'1 to d'3 between the temporary traveling path S and the vehicles X'1 to X'3 after the predetermined period, it is understood that even velocities or accelerated velocities of these vehicles X1 to X3 have varied, the distances d1 to d3 are approximately constant with almost "0" time change amount (i.e., d1−d'1=0, d2−d'2=0, and d3−d'3=0).

Figure 8:
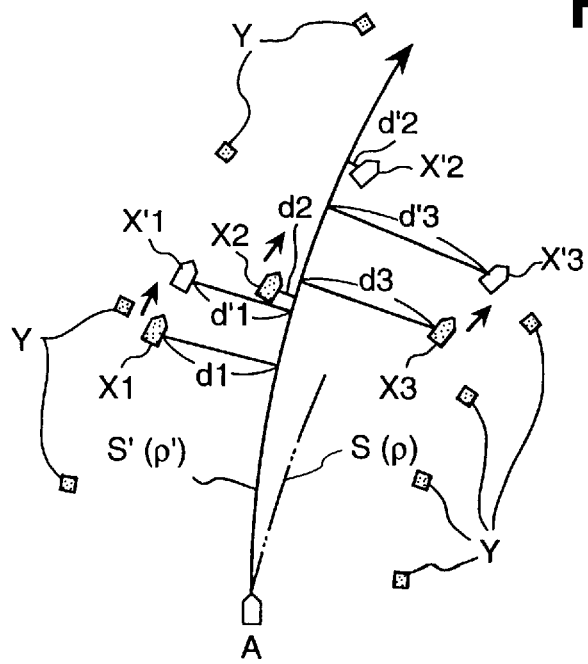

On the other hand, as shown in FIG. 8, if a curvature ρ' of a temporary traveling path S' of the vehicle is erroneously deduced, with running of the vehicles X1 to X3, the distances d1' to d3' change with passage of time.

That is, in comparison with the distances d'1 to d'3 between the temporary traveling path S' and the vehicles X'1 to X'3, the distances d1 to d3 between the temporary traveling path S' and the vehicles X1 to X3 are not always "0" (d1−d'1<0, d2−d'2=0, d3−d'3>0).

The traveling-path deduction method according to the present embodiment deduces a traveling path based on the above-mentioned curvature of a temporary traveling path of a vehicle and time change amount in distances between the other vehicles and the temporary traveling path. The positional change in these peripheral objects can be obtained by utilizing the results of detection by an existing radar unit. Note that in case of straight road, a traveling-path can be deduced in the same manner with the curvature "0". In this case, it is preferable that the traveling-path temporary-setting unit 21 sets a line extending forward with a practical curvature. For example, the traveling-path temporary-setting unit 21 may set a temporary traveling path within a turning radius (R+300 to R−300) possible in designing of a highway.

Figure 9:
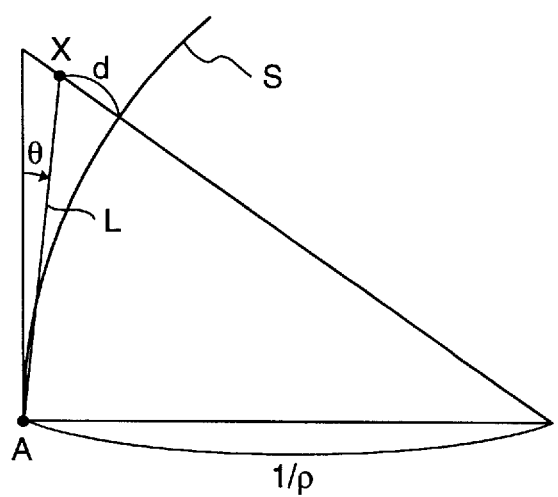

Further, the arithmetic unit 22 calculates a distance between a temporary line (traveling path) and an object to be described below. That is, as shown in FIG. 9, assuming that the curvature of a temporary line S is ρ; the distance between an vehicle A and an object X, L; an angle of the object X with respect to the straight line extending forward and backward of the vehicle A, θ; and the distance between the temporary line S and the object X (the length of a perpendicular line from the object X to the temporary line S), d, (assuming that this value is positive when the object X is positioned on the left side in FIG. 9, i.e., the outside of the temporary line S) the relation expressed by:

$$\left(\frac{1}{\rho} + d\right)^2 = (L \times \cos\theta)^2 + \left(\frac{1}{\rho} - L \times \sin\theta\right)^2 \quad \text{[Equation 1]}$$

As the curvature ρ is set within a very wide turning radius, 1/ρ is at the lowest 300 m. In comparison with this curvature, the distance d is very small $$\left(\frac{1}{\rho} \gg d\right).$$

Accordingly, assuming that $$\left(\frac{1}{\rho}\right)^2 \gg d^2, d^2$$

can be ignored. Since 1/ρ is a large value, θ is a small value (sin θ=θ).

Further, from equation 1, the distance d can be expressed by:

$$d = \frac{1}{2} \rho L^2 - L\theta \quad \text{[Equation 2]}$$

Figure 10:
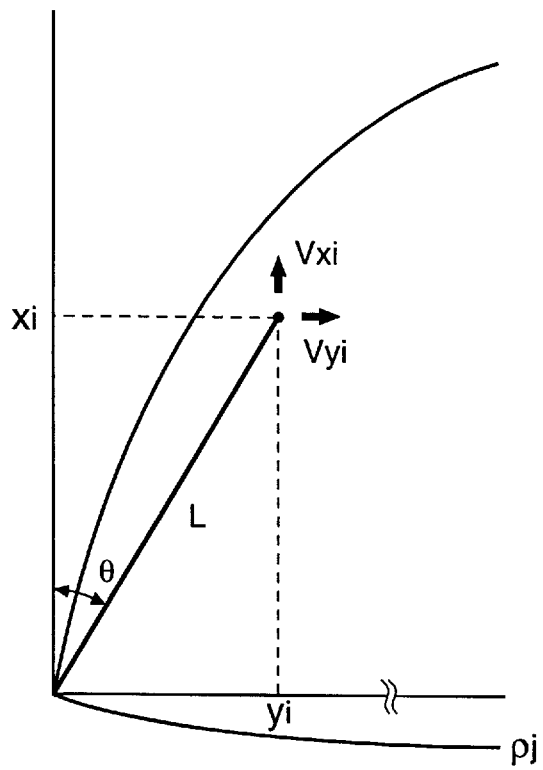

Further, as shown in FIG. 10, considering a case where the object X exists inside of the temporary line S, a distance dj between the object having positional coordinates (xi,yi) and the line with a curvature ρj with some curvature, when the value of the distance d is positive, is expressed by:

$$dj = yi - \frac{1}{2} \cdot \rho j \cdot xi^2 \quad \text{[Equation 3]}$$

substituting $$L = \sqrt{X^2 + Y^2} \quad \text{and} \quad \theta = \sin\theta - \frac{yi}{\sqrt{X^2 + Y^2}}$$

gives:

$$dj = -\left(\frac{1}{2} \rho j L^2 - L\theta\right) = -\frac{1}{2} \rho j(xi^2 + yi^2) + yi$$

From $xi \gg yi$, $dj = yi - \frac{1}{2} \rho j xi^2$

The arithmetic unit 22 obtains the distance d between the object X and the temporary line S by substituting the positional coordinates of the object X, detected by the radar unit 1, and the curvature of the line, set by the traveling-path temporary-setting unit 21, into equation 3.

First Embodiment

Next, the traveling-path deduction procedure by the control unit 2 in FIG. 1 according to the first embodiment will be described with reference to the flowchart of FIG. 2.

In FIG. 2, at step S11, position data xi, yi (i=1, ..., n) of the detected object are read as x,y coordinates by the control unit 2 from the radar unit 1. At step S12, a plurality of temporary traveling paths are set with different curvatures ρj(j=1, ..., m). At step S13, a sum total value ρj of transversal displacement amounts dj of all detected objects with respect to the respective temporary traveling paths is calculated from the above equation 3. Thereafter, at step S14, the absolute value ΔDj of difference is calculated between the current sum total value Dj(k) of the amounts of transversal displacement, calculated at step S13, and previous sum total value Dj(k−1).

Figure 3:
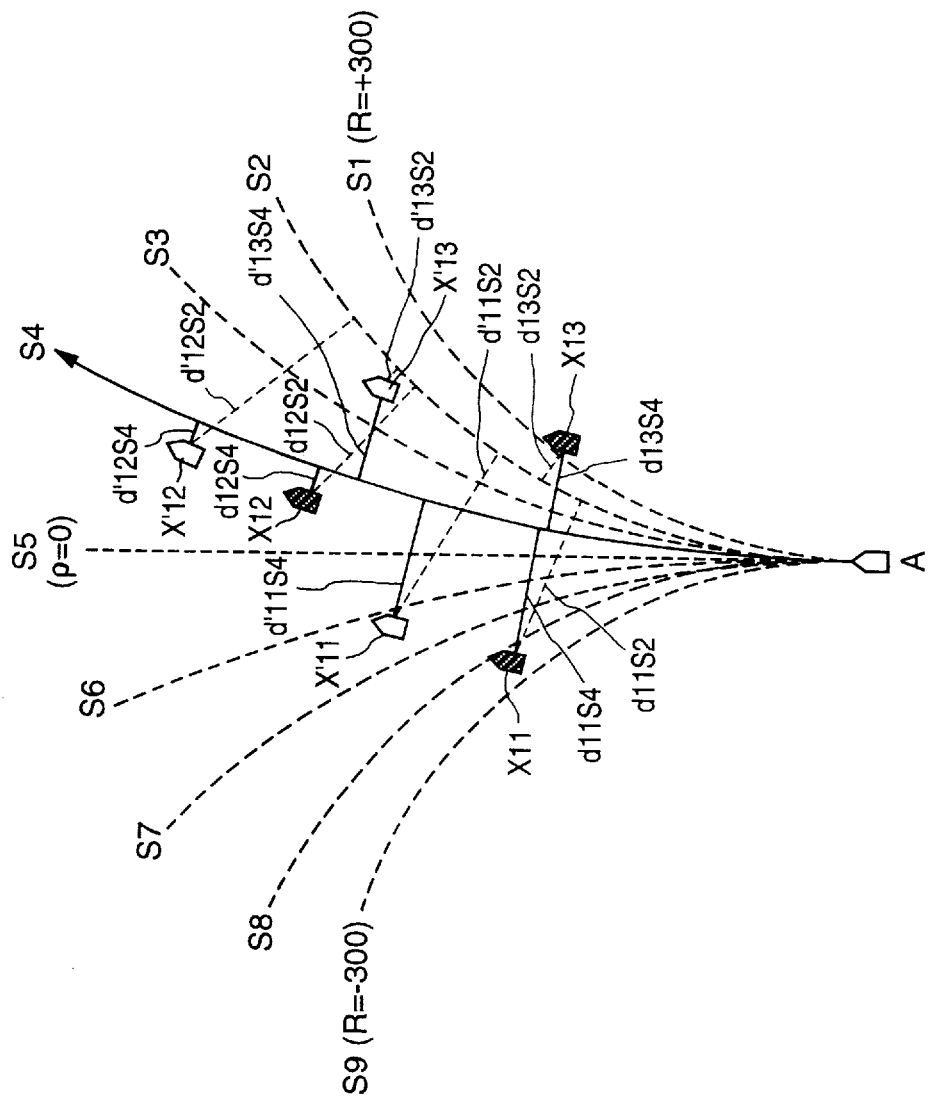
FIG. 3 is an explanatory view showing a traveling-path deduction method according to the first embodiment.

As shown in FIG. 3, the first embodiment sets a plurality of temporary traveling paths, as a traveling path S1 with a +300 rightward turning radius R, a traveling path S9 with a −300 leftward turning radius R, and seven traveling paths S2 to S8 with gradually varying curvatures.

Accordingly, as shown in FIG. 3, assuming that three preceding vehicles are detected at blank positions X'11 to X'13, and they were detected at the solid black positions X11 to X13 in previous detection, the amounts of transversal displacement d11S4, d12S4 and d13S4 (solid line) show almost no change. That is, comparing the previous amounts of transversal displacement d11S4, d12S4 and d13S4 of the vehicles X11 to X13, with respect to the temporary traveling path S4, with the current amounts of transversal displacement d'11S4, d'12S4 and d'13S4 of the vehicles X'11 to X'13 with respect to the temporary traveling path S4, it is found that the time change amount is approximately "0" (i.e., d11S4−d'11S4=0, d12S4−d'12S4=0, and d13S4−d'13S4=0).

As a result, the absolute value ΔDj calculated at step S14, i.e., the change amount with respect to the pre-set control cycle period is approximately "0".

On the other hand, regarding the other eight temporary traveling paths S1 to S3 and S5 to S9, the change amount ΔDj with respect to the control cycle period is considerably large. For example, in case of the temporary traveling path S2, previous amounts of transversal displacement d11S2, d12S2 and d13S2 of the vehicles X11 to X13 with respect to the temporary traveling path S2 have increased/decreased, otherwise positive/negative signs are reversed, in comparison with current amounts of transversal displacement d'11S2, d'12S2 and d'13S2 of the vehicles X'11 to X'13 with respect to the traveling path S2.

Returning to FIG. 2, at step S15, the minimum change amount is determined as ΔD from the change amounts ΔDj, regarding the temporary traveling paths S1 to S9 calculated at step S14. At steps S16 and S17, a traveling path related to the change amount ΔDj corresponding to the minimum change amount ΔD is searched. At step S18, a temporary traveling path with curvature ρj related to the change amount ΔDj, found in the search at steps S16 and S17, is determined as a traveling path on which the vehicle is going to travel. At step S19, based on the traveling path determined at step S18 and the position data of the objects, one of the preceding vehicles running on the traveling path ahead of the vehicle, closest to the vehicle, is discriminated as an object preceding vehicle.

According to the above-described first embodiment, an appropriate traveling path (in this embodiment traveling path S4 in FIG. 3) along with a locus of a preceding vehicle can be deduced in the above procedure.

Second Embodiment

Next, the traveling-path deduction procedure by the control unit 2 in FIG. 1 according to a second embodiment will be described with reference to the flowchart of FIG. 4.

In this traveling-path deduction procedure, different from the procedure according to the first embodiment that sets the plurality of temporary traveling paths S1 to S9 with different curvature at once, temporary traveling paths are set one by one, between the traveling path S1 and S9 shown in FIG. 3, by increasing/decreasing the curvature by a predetermined amount Δρ. Every time a temporary traveling path is set, time change in amounts of transversal displacement of the preceding vehicles with respect to the temporary traveling path is calculated, and the judgment is made with respect to the temporary traveling path.

Figure 4:
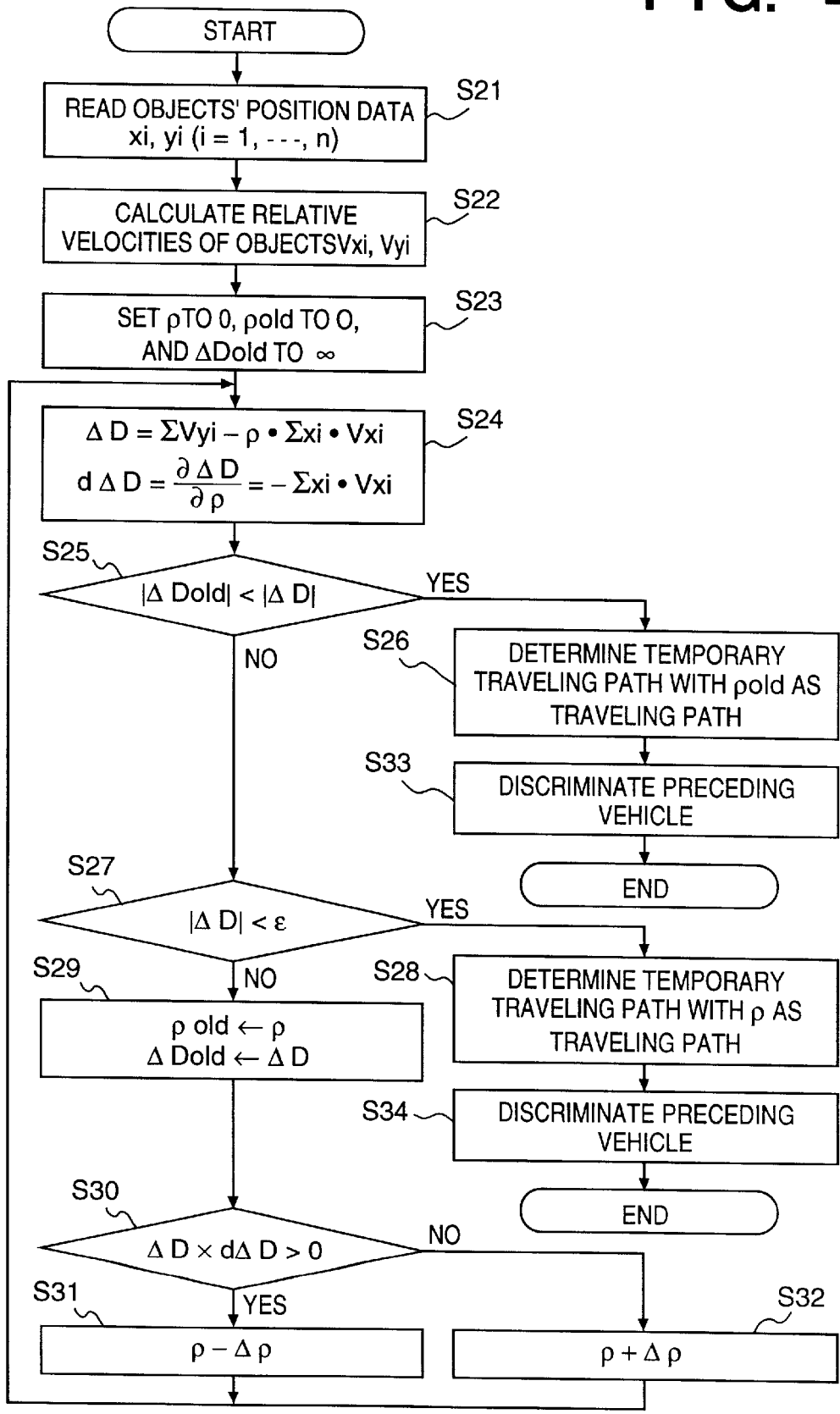
FIG. 4 is a flowchart showing the traveling-path deduction procedure according to a second embodiment.

As shown in FIG. 4, at step S21, position data xi, yi (i=1, ..., n) of the detected object are read as x,y coordinates, by the control unit 2 from the radar unit 1. At step S22, relative velocities Vxi, Vyi of the detected objects to the vehicle are calculated. At step S23, first, the curvature ρ of a traveling path to be temporarily set is set to "0", then the curvature ρold of a previous temporary traveling path is set to "0", and a time change amount (hereinafter simply referred to as "change amount") ΔDold of the sum total of the amounts of transversal displacement of all objects with respect to the previous temporary traveling path is set to "∞", as initial values.

At step S24, the change amount ΔD of the temporary traveling path with the curvature ρ, and the change rate dΔD of the change amount ΔD corresponding to the increment/decrement of the curvature ρ (hereinafter simply referred to as "change rate") are respectively calculated from:

$$\Delta D = \Sigma Vyi - \rho \cdot \Sigma xi \cdot Vxi \quad \text{[Equation 4]}$$

$$d\Delta D = \frac{\partial \Delta D}{\partial \rho} = -\Sigma xi \cdot Vxi \quad \text{[Equation 5]}$$

Note that the traveling-path deduction procedure according to the second embodiment does not calculate the change amount $\Delta D$ as a change amount with respect to a predetermined control cycle as in the first embodiment, but calculates the change amount $\Delta D$ by using the object position data xi, yi read at step S21, the object relative velocities Vxi, Vyi, and the curvature $\rho$ calculated at step S22. Note that equation 4 to calculate the change amount $\Delta D$ is derived from equation 3 on the premise that the curvature $\rho$ is constant in a predetermined period, as follows:

$$\begin{aligned}
\Delta D &= \frac{d}{dt} \Sigma dj \quad \text{[Equation 4a]} \\
&= \frac{d}{dt} \Sigma yi - \frac{1}{2} \cdot \rho \cdot \frac{d}{dt} \Sigma xi^2 \\
&= \Sigma \frac{dyi}{dt} - \frac{1}{2} \cdot \rho \cdot \Sigma \frac{dxi^2}{dt} \\
&= \Sigma \frac{dyi}{dt} - \rho \cdot \Sigma xi \frac{dxi}{dt} \\
&= \Sigma Vyi - \rho \cdot \Sigma xi \cdot Vxi
\end{aligned}$$

Returning to FIG. 4, at step S25, it is determined whether or not the absolute value of the change amount $\Delta D$ of the current temporary traveling path is greater than the absolute value of the change amount $\Delta Dold$ of the previous temporary traveling path. If it is determined at step S25 that the absolute value of the change amount $\Delta D$ of the current temporary traveling-path is greater than that of the change amount $\Delta Dold$ of the previous temporary traveling-path (YES at step S25) (as the change amount becomes closer to "0", the temporary traveling path becomes closer to an actual traveling path. If $|\Delta D|>|\Delta Dold|$ holds, it means that the temporary traveling path is far from the actual traveling path), the process proceeds to step S26, at which the previous temporary traveling path with the curvature $\rho old$ is determined as a traveling path. At step S33, based on the traveling path determined at step S26 and the object position data, one of the preceding vehicles running ahead of the vehicle, closest to the vehicle, is discriminated as an object preceding vehicle.

On the other hand, if it is determined at step S25 that the absolute value of the change amount $\Delta D$ of the current temporary traveling path is less than that of the change amount $\Delta Dold$ of the previous temporary traveling path (NO at step S25), the process proceeds to step S27, at which whether or not the absolute value of the change amount $\Delta D$ is less than a predetermined value $\epsilon$ is determined. If it is determined at step S27 that the absolute value of the change amount $\Delta D$ of the current temporary traveling path is less than the predetermined value $\epsilon$ (YES at step S27), the process proceeds to step S28 at which the current temporary traveling path with the curvature $\rho$ is determined as a traveling path. At step S34, based on the traveling path determined at step S28 and the object position data, one of the preceding vehicles running ahead of the vehicle, closest to the vehicle, is discriminated as an object preceding vehicle.

If it is determined at step S27 that the absolute value of the change amount $\Delta D$ of the current temporary traveling path is greater than the predetermined value $\epsilon$ (NO at step S27), the process proceeds to step S29, at which update processing is performed to change the current curvature $\rho$ and the change amount $\Delta D$ into previous curvature $\rho old$ and the change amount $\Delta Dold$. Thereafter, at step S30, it is determined whether or not a value obtained by multiplying the change amount $\Delta D$ with the change rate $d\Delta D$ calculated at step S24 is positive or negative.

If it is determined at step S30 that the calculated value is positive (YES at step S30), the process proceeds to step S31, at which the curvature $\rho$ is decremented by a predetermined value $\Delta\rho$, while if the calculated value is "0" or negative (NO at step S30), the process proceeds to step S32, at which the curvature $\rho$ is incremented by the predetermined value $\Delta\rho$. The processing at steps S24 to S32 is repeated with the newly-set curvature $\rho$ until the a traveling path is finally deduced at step S26 or S28.

Figure 5:
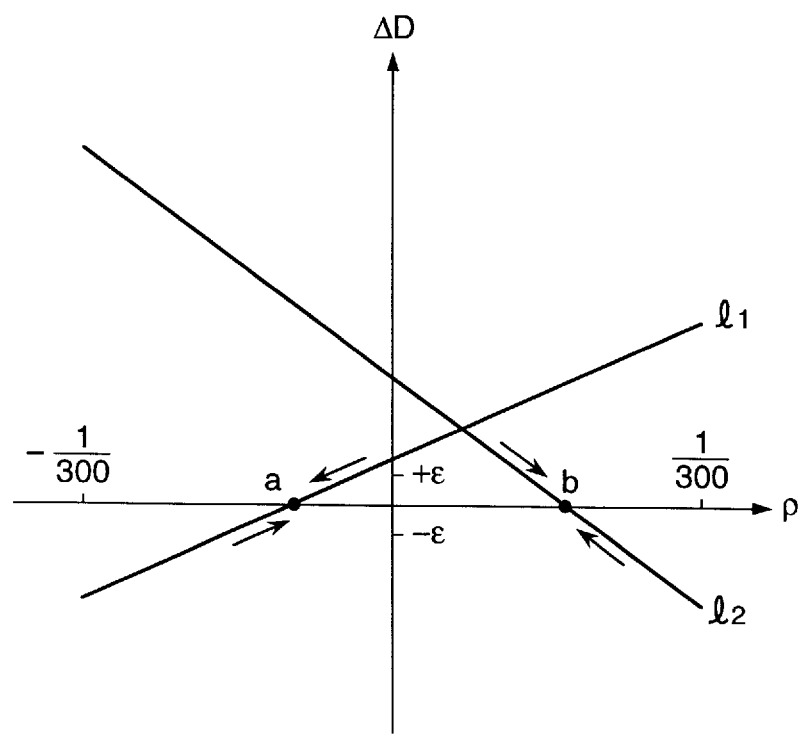
FIG. 5 is a coordinate plane for explaining the meaning of traveling-path deduction processing according to the second embodiment.

Note that the meaning of the processing operation at steps S30 to S32 will be clarified by the following explanation with reference to FIG. 5.

Meaning of Processing Operation at Steps S30 to S32

The meaning of the traveling-path deduction procedure according to the second embodiment will be described with reference to FIG. 5.

In FIG. 5, equation 4 representing the relation between the aforementioned curvature $\rho$ and the change amount $\Delta D$ is shown as a straight line 11 or 12, for example. The change rate $d\Delta D$ is represented as the inclination of the line 11 or 12, and if the inclination is positive in the diagonally right-upward line 11, while is negative in the diagonally left-upward line 12. Accordingly, if the value obtained at step S30 by multiplying the change amount $\Delta D$ with the change rate $d\Delta D$ is positive, the change amount $\Delta D$ is positive in the straight line 11 where the change rate $d\Delta D$ is always positive, while the change amount $\Delta D$ is negative in the straight line 12 where the change rate $d\Delta D$ is always negative. In this case, the curvature $\rho$ is decremented by the predetermined value $\Delta\rho$ at step S31.

On the other hand, if the value obtained at step S30 by multiplying the change amount $\Delta D$ with the change rate $d\Delta D$ is negative, the change amount $\Delta D$ of the straight line 11 is negative, while that of the straight line 12 is positive. In this case, the curvature $\rho$ is incremented by the predetermined value $\Delta\rho$ at step S32. As a result, the next curvature $\rho$ is sequentially set in the direction where the absolute value of the change amount $\Delta D$ decreases, thus the curvature becomes closer to a point a or b at which the change amount $\Delta D$ is "0", i.e., an appropriate curvature along with the moving direction of the preceding vehicle.

At this time, if the next curvature is set over the point a or b, a curvature more closer to the point a or b is selected by comparison with the previous change amount at step S25.

When the next curvature is set not to exceed the point a or b, the change amount $\Delta D$ is calculated at step S24, as a result, if the absolute value of the change amount $\Delta D$ is less than $\epsilon$ (step S27), the curvature $\rho$ is selected at step S28. If the absolute value of the change amount $\Delta D$ is greater than $\epsilon$ (step S27), the values of the curvature $\rho$ and the change amount $\Delta D$ are updated at step S29, and the control through steps S30 to S32 is performed again.

Thus, at steps S25 and S26, a traveling path with the change amount $\Delta D$ closer to "0" is deduced, otherwise, at steps S27 and S28, a traveling path with the change amount $\Delta D$ more closer to "0" within a predetermined range is deduced.

Note that if a neutral line of the radar unit 1 is shifted, the traveling-path deduction may have an error. In this case, the above equation 3 can be replaced with the following equations 6 and 7 having a lateral slip angle $\beta$ as a parameter:

$$dj = yi - \left( \beta \cdot xi + \frac{1}{2} \cdot \rho j \cdot xi^2 \right) \quad \text{[Equation 6]}$$

$$\Delta D = \frac{d}{dt} \Sigma dj \quad \text{[Equation 7]}$$

$$= \frac{d}{dt} \Sigma yi - \beta \cdot \frac{d}{dt} \Sigma xi - \frac{1}{2} \cdot \rho \cdot \frac{d}{dt} \Sigma xi^2$$

Third Embodiment

Next, the traveling-path deduction procedure by the control unit 2 in FIG. 1 according to a third embodiment will be described with reference to the flowchart of FIG. 6.

This traveling-path prediction procedure deduces a traveling path on which the vehicle is going to run, from past traveling records.

Figure 6:
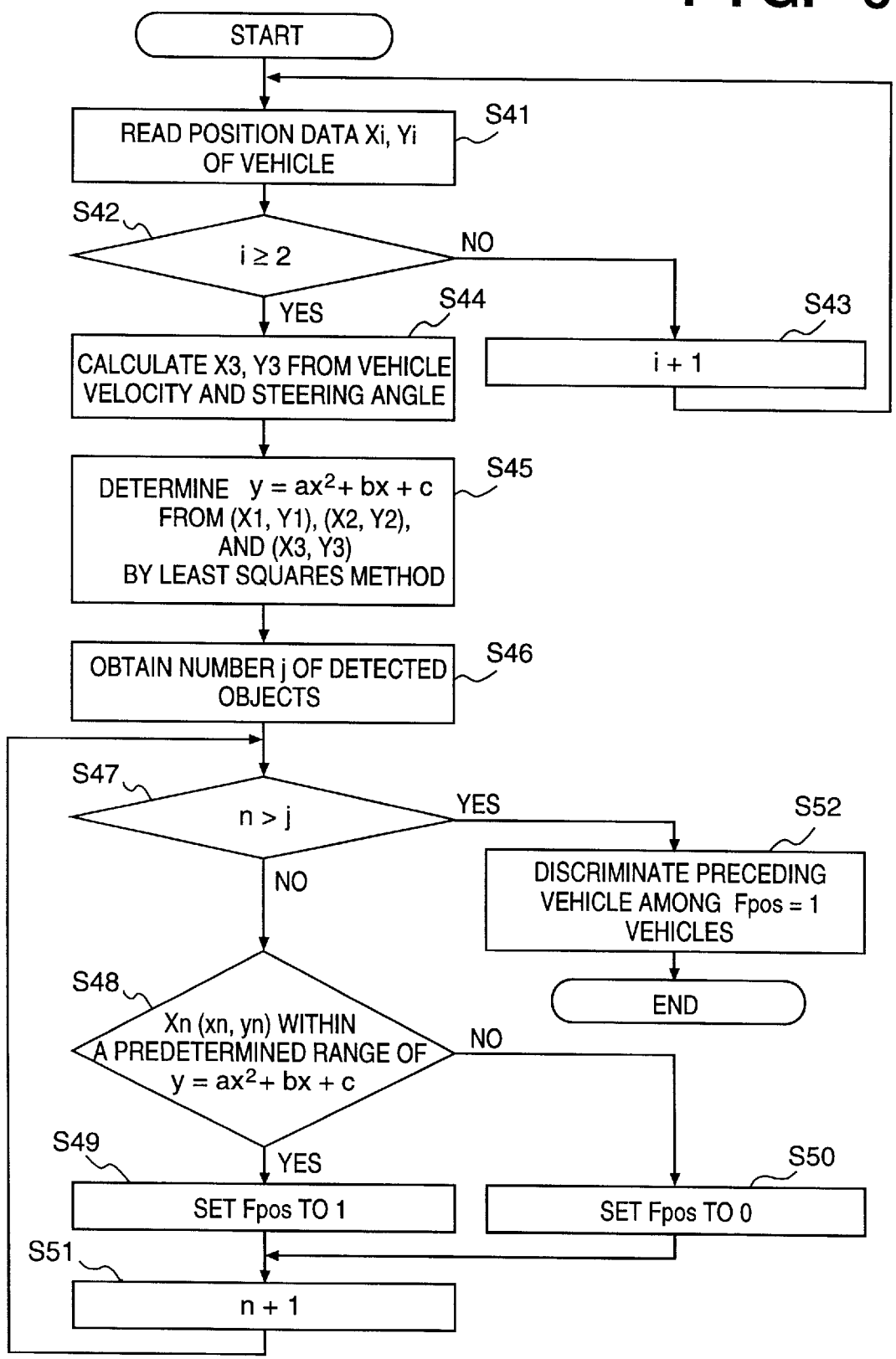
FIG. 6 is a flowchart showing the traveling-path deduction procedure according to the third embodiment.

As shown in FIG. 6, at step S41, position data Xi, Yi (i=number of position data read past) of the vehicle are read by the control unit 2 as X-Y coordinates from the radar unit 1. At step S42, whether or not the number of position data i is two or more is determined. If it is determined at step S42 that the number i is two or more (YES at step S42), the process proceeds to step S44. If the number i read at step S41 is less than two, the process proceeds to step S43 at which the number i is incremented, then the process returns to step S41 to again read the position data.

At step S44, in addition to the two position data (X1,Y1), (X2,Y2) read at step S41, the third position data (X3,Y3) of the vehicle is calculated from a vehicle velocity and a steering angle of the vehicle. At step S45, a curvilinear function is determined by using a least squares method, from the three position data (X1,Y1), (X2,Y2) read at step S41 and (X3,Y3) calculated at step S44. The obtained curvilinear function is determined as a future running curve of the vehicle, i.e., the traveling path.

Thereafter, at step S46, the number of objects j detected by the radar unit 1 is obtained. At step S47, it is determined whether or not the number of processing n, through steps S48 to S51 to be described later, exceeds the number of objects j. If it is determined at step S47 that the number of processing n exceeds the number of objects j (YES at step S47), the process proceeds to step S52. At step S52, one of the preceding vehicles, which is closest to the vehicle, is discriminated as an object preceding vehicle, based on the traveling path determined at step S45 and a flag Fpos to be described later. Then the process ends.

On the other hand, if it is determined at step S47 that the number of processing n does not exceed the number of objects j (NO at step S47), the process proceeds to step S48, at which the position data Xn(xn,yn) is compared with the traveling path determined at step S45 so as to determine whether or not respective objects Xn exist within a predetermined range from the traveling path, e.g., one meter right and left to the traveling path. If it is determined at step S48 that the respective objects Xn exist within the predetermined range from the traveling path (YES at step S48), the flag Fpos indicative of the positional status of the objects is set to "1", then the process proceeds to step S51. On the other hand, if the respective objects Xn do not exist within the predetermined range from the traveling path (NO at step S48), the flag Fpos is set to "0", then the process proceeds to step S51. At step S51, the number n of objects X is incremented, and the process returns to step S47, to repeat the processing through steps S47 to S51. Thus, based on the flag Fpos indicative of the positional status of the objects, one of the preceding vehicles, which is closest, is discriminated as an object preceding vehicle.

As described above, the traveling-path deduction method according to the first to third embodiments deduces a traveling path of a vehicle from peripheral objects detected by an existing radar unit or position data of the vehicle. This omits the conventional steering-angle sensor, the yaw-rate sensor and the like, thus reducing manufacturing costs of the vehicle.

Otherwise, a traveling path of a vehicle can be deduced only from position data of preceding vehicles obtained from the radar unit.

Further, the traveling-path temporary-setting unit sets a plurality of temporary traveling paths with different curvatures, and the traveling-path determination unit determines one of the temporary traveling-paths respectively having different time change amounts in distances between peripheral objects and the temporary traveling path, detected by the radar unit, which has the minimum time change amount, as a traveling path. Thus, the temporary traveling path, approximately close to a traveling path on which the vehicle should run, can be deduced from the plurality of temporary traveling paths with different curvatures.

Further, the traveling-path temporary-setting unit simultaneously sets a plurality of temporary traveling paths with different curvatures, and the traveling-path determination unit determines one of the temporary traveling-paths respectively having different time change amounts in distances between peripheral objects and the temporary traveling path, detected by the radar unit, which has the minimum time change amount, as a traveling path. Thus, by simultaneously setting a plurality of temporary traveling paths with different curvatures, one temporary traveling path closest to a traveling path on which the vehicle should run can be determined at one time.

Further, the traveling-path temporary-setting unit sets a plurality of temporary traveling paths with different curvatures one by one, by increasing/decreasing the curvature of a reference temporary traveling path by a predetermined amount. This also enables to deduce a temporary traveling path closest to a traveling path on which the vehicle should run.

In this case, the traveling-path determination unit determines a temporary traveling path which has a time change amount in distances between peripheral objects and the temporary traveling path, detected by the radar unit, equal to or less than a predetermined value, as a traveling path, while the traveling-path temporary-setting unit sets the plurality of temporary traveling paths one by one. Thus, a temporary traveling path, close to a traveling path on which the vehicle should run, can be found while the temporary traveling paths are being set in order.

Further, the traveling-path temporary-setting unit sets a plurality of temporary traveling paths with different curvatures one by one, in decremental order of time change amounts respectively in distances between peripheral objects and the temporary traveling path, detected by the radar unit. Thus, by sequentially setting the temporary traveling paths in the decremental order of time change amounts, a temporary traveling path, close to a traveling path on which the vehicle should run, can be efficiently found.

In this case, the traveling-path determination unit determines a temporary traveling path which has been set prior to a current temporary traveling path showing transition from decrement to increment of time change amount in distances between peripheral objects and the temporary traveling path detected by the radar unit, as a traveling path of the vehicle.

That is, while sequentially setting temporary traveling paths, if time change amount of one temporary traveling path changes from decrement to increment, the previous temporary traveling path is determined as a traveling path of the vehicle. In this manner, a temporary traveling path having the minimum time change amount, i.e., closest to a traveling path on which the vehicle should run can be determined as a traveling path.

Further, one of a plurality of preceding vehicles running on the traveling path determined by the traveling-path determination unit, which is closest to the vehicle, can be discriminated as an object preceding vehicle. That is, the object preceding vehicle can be discriminated from the deduced traveling path and detected objects.

The present invention is not limited to the above embodiments and various changes and modifications can be made within the spirit and scope of the present invention. Therefore, to apprise the public of the scope of the present invention, the following claims are made.

What is claimed is:

1. A traveling-path deduction apparatus which detects objects existing ahead of a vehicle and deduces a traveling path of the vehicle, comprising:
   (a) object detection means for detecting the positions of objects existing ahead of the vehicle;
   (b) traveling-path temporary-setting means for setting at least one temporary traveling path as a line having a predetermined curvature, extending from the vehicle as an original point, based on results of detection by said object detection means;
   (c) distance calculation means for calculating distances between the temporary traveling path set by said traveling-path temporary-setting means and the objects detected by said object detection means; and
   (d) traveling-path deduction means for deducing the traveling path of the vehicle, based on a time change amount in the distances calculated by said distance calculation means.

2. The traveling-path deduction apparatus according to claim 1, wherein in a case where said traveling-path temporary-setting means sets a plurality of temporary traveling paths with different curvatures, said traveling-path deduction means deduces a temporary traveling path having the minimum time change amount in the distances calculated by said distance calculation means, as the traveling path of the vehicle.

3. The traveling-path deduction apparatus according to claim 2, wherein said traveling-path temporary-setting means simultaneously sets the plurality of temporary traveling paths with different curvatures.

4. The traveling-path deduction apparatus according to claim 2, wherein said traveling-path temporary-setting means sequentially sets the plurality of temporary traveling paths with different curvatures.

5. The traveling-path deduction apparatus according to claim 4, wherein said traveling-path deduction means deduces a temporary traveling path having a time change amount in the distances, calculated by said distance calculation means, equal to a predetermined value or less, as the traveling path of the vehicle.

6. The traveling-path deduction apparatus according to claim 4, wherein said traveling-path temporary-setting means sets the plurality of temporary traveling paths with different curvatures, in incremental order of time change amount in the distances calculated by said distance calculation means, one by one.

7. The traveling-path deduction apparatus according to claim 4, wherein said traveling-path deduction means deduces a previous temporary traveling path as the traveling path of the vehicle, if a current temporary traveling path shows transition from decrement to increment of the time change amount in the distances calculated by said distance calculation means.

8. The traveling-path deduction apparatus according to claim 6, wherein said traveling-path deduction means deduces a previous temporary traveling path as the traveling path of the vehicle, if a current temporary traveling path shows transition from decrement to increment of the time change amount in the distances calculated by said distance calculation means.

9. The traveling-path deduction apparatus according to claim 1, further comprising preceding-vehicle discrimination means for discriminating a running object among objects existing within the traveling path deduced by said traveling-path deduction means, closest to the vehicle, as a preceding vehicle.

10. A traveling-path deduction method for detecting objects existing ahead of the vehicle and deducing a traveling path of the vehicle, comprising:
    (a) an object detection step of detecting the positions of objects existing ahead of the vehicle;
    (b) a traveling-path temporary-setting step of setting at least one temporary traveling path as a line having a predetermined curvature, extending from the vehicle as an original point, based on results of detection at said object detection step;
    (c) a distance calculation step of calculating distances between the temporary traveling path set at said traveling path temporary-setting step and the objects detected at said object detection step; and
    (d) a traveling-path deduction step of deducing the traveling path of the vehicle, based on a time change amount in the distances calculated at said distance calculation step.

11. The traveling-path deduction method according to claim 10, wherein in a case where a plurality of temporary traveling paths are set with different curvatures at said traveling-path temporary-setting step, a temporary traveling path, having the minimum time change amount in the distances calculated at said distance calculation step, is deduced as the traveling path of the vehicle at said traveling-path deduction step.

12. The traveling-path deduction method according to claim 10, wherein in a case where a plurality of temporary traveling paths are set at said traveling-path temporary-setting step, the plurality of temporary traveling paths are simultaneously set with different curvatures.

13. The traveling-path deduction method according to claim 11, wherein at said traveling-path temporary-setting step, the plurality of temporary traveling paths are simultaneously set with different curvatures.

14. The traveling-path deduction method according to claim 11, wherein at said traveling-path temporary-setting step, the plurality of temporary traveling paths are sequentially set with different curvatures.

15. The traveling-path deduction method according to claim 14, wherein at said traveling-path deduction step, a temporary traveling path, having a time change amount in the distances calculated at said distance calculation step, equal to a predetermined value or less, is deduced as the traveling path of the vehicle.

16. The traveling-path deduction method according to claim 14, wherein at said traveling-path temporary-setting step, the plurality of temporary traveling paths are set with different curvatures, in incremental order of time change amount in the distances calculated at said distance calculation step, one by one.

17. The traveling-path deduction method according to claim 14, wherein at said traveling-path deduction step, a previous temporary traveling path is deduced as the traveling path of the vehicle, if a current temporary traveling path shows transition from decrement to increment of the time change amount in the distances calculated at said distance calculation step.

18. The traveling-path deduction method according to claim 16, wherein at said traveling-path deduction step, a previous temporary traveling path is deduced as the traveling path of the vehicle, if a current temporary traveling path shows transition from decrement to increment of the time change amount in the distances calculated at said distance calculation step.

19. The traveling-path deduction method according to claim 10, further comprising a preceding-vehicle discrimination step of discriminating a running object among objects existing within the traveling path deduced at said traveling-path deduction step, closest to the vehicle, as a preceding vehicle.

20. A traveling-path deduction apparatus which detects objects existing ahead of a vehicle and deduces a traveling path of the vehicle, comprising:
(a) object detection means for detecting the positions of objects existing ahead of the vehicle;
(b) traveling-path temporary-setting means for setting a plurality of temporary traveling paths as respective lines having predetermined different curvatures, extending from the vehicle as an original point, based on results of detection by said object detection means;
(c) distance calculation means for calculating distances between the respective plurality of temporary traveling paths set by said traveling-path temporary-setting means and the objects detected by said object detection means; and
(d) traveling-path deduction means for deducing the traveling path of the vehicle, based on a time change amount in the distances calculated by said distance calculation means, and wherein said traveling-path deduction means deduces a temporary traveling path having the minimum time change amount in the distances calculated by said distance calculation means, as the traveling path of the vehicle.

21. The traveling-path deduction apparatus according to claim 20, wherein said traveling-path temporary-setting means simultaneously sets the plurality of temporary traveling paths having different curvatures.

22. The traveling-path deduction apparatus according to claim 20, wherein said traveling-path temporary-setting means sequentially sets the plurality of temporary traveling paths having different curvatures.

23. The traveling-path deduction apparatus according to claim 22, wherein said traveling-path deduction means deduces a temporary traveling path having a time change amount in the distances, calculated by said distance calculation means, equal to a predetermined value or less, as the traveling path of the vehicle.

24. The traveling-path deduction apparatus according to claim 22, wherein said traveling-path temporary-setting means sets the plurality of temporary traveling paths having different curvatures, in incremental order of time change amount in the distances calculated by said distance calculation means, one by one.

25. The traveling-path deduction apparatus according to claim 22, wherein said traveling-path deduction means deduces a previous temporary traveling path as the traveling path of the vehicle, if a current temporary traveling path shows transition from decrement to increment of the time change amount in the distances calculated by said distance calculation means.

26. The traveling-path deduction apparatus according to claim 24, wherein said traveling-path deduction means deduces a previous temporary traveling path as the traveling path of the vehicle, if a current temporary traveling path shows transition from decrement to increment of the time change amount in the distances calculated by said distance calculation means.

27. A traveling-path deduction method for detecting objects existing ahead of the vehicle and deducing a traveling path of the vehicle, comprising:
(a) an object detection step of detecting the positions of objects existing ahead of the vehicle;
(b) a traveling-path temporary-setting step of setting a plurality of temporary traveling paths as lines having respective predetermined curvatures, extending from the vehicle as an original point, based on results of detection at said object detection step;
(c) a distance calculation step of calculating distances between the respective temporary traveling paths set by said traveling path temporary-setting step and the objects detected at said object detection step; and
(d) a traveling-path deduction step of deducing the traveling path of the vehicle, based on a time change amount in the distances calculated at said distance calculation step, wherein a temporary traveling path, having the minimum time change amount in the distances calculated at said distance calculation step, is deduced as the traveling path of the vehicle.

28. A traveling-path deduction method for detecting objects existing ahead of the vehicle and deducing a traveling path of the vehicle, comprising:
(a) an object detection step of detecting the positions of objects existing ahead of the vehicle;
(b) a traveling-path temporary-setting step of setting a plurality of temporary traveling paths as lines having respective predetermined curvatures, extending from the vehicle as an original point, based on results of detection at said object detection step;
(c) a distance calculation step of calculating distances between the respective temporary traveling paths set by said traveling-path temporary-setting step and the objects detected at said object detection step; and
(d) a traveling-path deduction step of deducing the traveling path of the vehicle, based on a time change amount in the distances calculated at said distance calculation step, wherein at said traveling-path temporary-setting step, the plurality of temporary traveling paths are simultaneously set with different curvatures.

29. The traveling-path deduction method according to claim 27, wherein at said traveling-path temporary-setting step, the plurality of temporary traveling paths are simultaneously set with different curvatures.

30. The traveling-path deduction method according to claim 27, wherein at said traveling-path temporary-setting step, the plurality of temporary traveling paths are sequentially set with different curvatures.

31. The traveling-path deduction method according to claim 30, wherein at said traveling-path deduction step, a temporary traveling path, having a time change amount in the distances calculated at said distance calculation step, equal to a predetermined value or less, is deduced as the traveling path of the vehicle.

32. The traveling-path deduction method according to claim 30, wherein at said traveling-path temporary-setting step, the plurality of temporary traveling paths are set with different curvatures, in incremental order of time change amount in the distances calculated at said distance calculation step, one by one.

33. The traveling-path deduction method according to claim 30, wherein at said traveling-path deduction step, a previous temporary traveling path is deduced as the traveling path of the vehicle, if a current temporary traveling path shows transition from decrement to increment of the time change amount in the distances calculated at said distance calculation step.

34. The traveling-path deduction method according to claim 32, wherein at said traveling path deduction step, a previous temporary traveling path is deduced as the traveling path of the vehicle, if a current temporary traveling paths shows transition from decrement to increment of the time change amount in the distances calculated at said distance calculation step.

* * * * *

UNITED STATES PATENT AND TRADEMARK OFFICE
CERTIFICATE OF CORRECTION

PATENT NO.: 5,841,366
DATED : November 24, 1998
INVENTOR(S): Yasunori Yamamoto, et al.

It is certified that error appears in the above-identified patent and that said Letters Patent is hereby corrected as shown below:

Column 4, lines 7 and 8, change " = " (equals) to --≅--;
line 18, change " = " (equals) to --≅--;
line 41, change "O" to --θ--.

Column 5, line 38, change "pj" to --Dj--;
lines 63-64, change " = " (equals) to --≅--.

Column 8, line 25, change "11 or 12" to --ℓ1 or ℓ2;
line 26, change "11 or 12" to --ℓ1 or ℓ2;
line 28, change "11" to --ℓ1;
line 29, change "12" to --ℓ2;
line 32, change "11" to --ℓ1;
line 40, change "11" and "12" to --ℓ1-- and --ℓ2--;
line 48, change "a" to --a--;
line 49, change "a" and "b" to --a-- and --b--.

Signed and Sealed this

Tenth Day of August, 1999

Attest:

Q. TODD DICKINSON

*Attesting Officer*     Acting Commissioner of Patents and Trademarks